United States Patent [19]

McClelland et al.

[11] Patent Number: 4,695,490

[45] Date of Patent: Sep. 22, 1987

[54] SEAL FOR LIQUID CRYSTAL DISPLAY

[75] Inventors: Sandra K. McClelland, Bordentown Township, Burlington County; Neal D. Conrad, Ewing Township, Mercer County; Nitin V. Desai, East Windsor Township, Mercer County, all of N.J.

[73] Assignee: RCA Corporation, Princeton, N.J.

[21] Appl. No.: 787,679

[22] Filed: Oct. 15, 1985

[51] Int. Cl.[4] .................... B32B 17/10; C09K 19/00
[52] U.S. Cl. .......................................... 428/1; 350/343; 428/192; 428/343
[58] Field of Search ............... 350/343; 428/1, 192, 428/343

[56] References Cited

U.S. PATENT DOCUMENTS

| | | | |
|---|---|---|---|
| 4,135,789 | 1/1979 | Hall | 350/343 |
| 4,222,635 | 9/1980 | Julke | 350/343 |
| 4,227,779 | 10/1980 | Bissar et al. | 350/343 |
| 4,297,401 | 10/1981 | Chern | 350/343 |
| 4,325,610 | 4/1982 | Inoue | 350/343 |
| 4,388,139 | 6/1983 | Fuller | 350/351 |
| 4,401,537 | 8/1983 | Chern et al. | 350/343 |
| 4,418,102 | 11/1983 | Ferrato | 350/343 |
| 4,470,668 | 9/1984 | Inoue et al. | 350/342 |
| 4,494,825 | 1/1985 | Sasaki et al. | 350/343 |
| 4,500,171 | 2/1985 | Penz et al. | 350/320 |
| 4,514,041 | 4/1985 | Tanaka | 350/337 |
| 4,536,060 | 8/1985 | Takamatsu et al. | 350/343 |

*Primary Examiner*—Foelak, Morton
*Attorney, Agent, or Firm*—Eugene M. Whitacre; William J. Burke

[57] ABSTRACT

A sealant composition to seal the fill port in a liquid crystal display is disclosed. The subject composition is comprised of a diglycidylether of bisphenol A epoxy precursor, a curing agent therefor and, optionally, a minor amount of a thixotropic agent.

6 Claims, 1 Drawing Figure

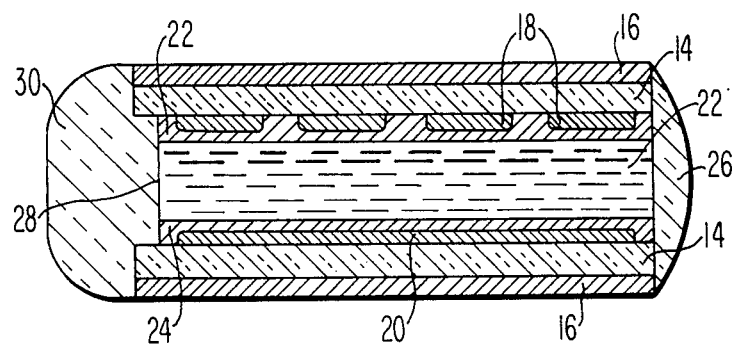

SEAL FOR LIQUID CRYSTAL DISPLAY

This invention relates to a liquid crystal display, specifically to a means of sealing the fill port in such a display after it is filled with liquid crystal material.

BACKGROUND OF THE INVENTION

A liquid crystal display (LCD) comprises liquid crystal material contained within two spaced-apart liquid crystal substrates which are sealed at the periphery. Conventionally, LCDs are manufactured by assembling the substrates in a spaced-apart relation, sealing the substrates together around their periphery with the exception of one or more fill ports to form an enclosure, inserting the liquid crystal material between the substrates and sealing the fill ports. The liquid crystal material is inserted into the display only after most processing of the other components is completed because many types of liquid crystal material may be decomposed by the temperatures utilized, for example, to heat-seal the periphery.

Sealing of the fill port has been a very troublesome step in the manufacture of LCDs. The problems associated with fill port sealing are partially due to the fact that there are a number of different surfaces to which the sealant must simultaneously form a stable adhesive bond of acceptable strength, partially due to the sensitivity of liquid crystal materials to any impurities that can leach out of the sealant and partially due to their sensitivity to elevated cure temperatures. The adverse effects of any of these problems include failure of the seal, loss of alignment of the liquid crystal material, loss of on/off capability of the display, a significant increase in the voltage required to switch the display, and the like.

The difficulty encountered to date in effectively sealing the fill port of an LCD is apparent when one considers the variety of means and agents that have been proposed as solutions to the problem. For example, U.S. Pat. No. 4,470,668 discloses sealing LCDs made of flexible polymeric film with a solvent-free, reaction-setting polysiloxane polymer; U.S. Pat. No. 4,500,171 discloses a method of welding the fill port closed using heat and pressure; U.S. Pat. No. 4,135,789 discloses sealing the fill port with a glass bead which is separated from the liquid crystal by an inert insulating pad; U.S. Pat. No. 4,494,825 discloses a photosetting sealant composition comprising an acrylic or methacrylic resin and at least two photosensitizers which differ in curing time; U.S. Pat. No. 4,325,610 discloses a sealing composition comprising a polyamide or a linear saturated polyester, an epoxy resin and/or an isocyanate compound and a solvent therefor which also is a solvent for the LCD panel which is formed of polyester or polyether sulfone; and U.S. Pat. No. 4,536,060 discloses a two-layer seal for LCDs, the outer layer comprised of a thermoplastic polyamide and the inner layer composed of a saturated polyester. An improved composition for effectively sealing the fill port of an LCD is provided herein.

SUMMARY OF THE INVENTION

Liquid crystal displays are sealed in accordance with this invention with a composition comprising a resin component of a diglycidylether of bisphenol A, a particular amine curing agent therefor, and, optionally, a minor amount of a thixotropic agent.

BRIEF DESCRIPTION OF THE DRAWING

The FIGURE is a sectional view of an LCD taken along a line which bisects the fill port.

DETAILED DESCRIPTION OF THE INVENTION

The FIGURE illustrates a cross section of a typical LCD 10 for twisted nematic liquid crystals wherein the liquid crystal material 12 is completely sealed within the device. The LCD 10 is comprised of two transparent liquid crystal substrates 14, which are suitably of glass or a transparent plastic. On the outside of the transparent substrates 14 are linear polarizer layers 16 which are aligned cross-wise to each other.

On the inside of the transparent substrates 14 are arranged transparent electrodes 18 and an electrode layer 20 which are conventionally in the form of electrically conductive coatings of a material such as tin oxide, indium oxide, mixtures thereof and the like. The electrodes are coated with orientation or alignment layers 22 and 24. The transparent substrates 14 are separated by spacers, not illustrated, and a sealant 26 is arranged around the periphery of the substrates 14 with the exception of fill port 28, thus producing an opening into which the liquid crystal material 12 is inserted. A seal 30 completes the LCD.

LCDs are typically manufactured by preparing the individual layers of material, assembling them generally in the relationship illustrated in the FIGURE and sealing the periphery except for one or more fill ports. The liquid crystal material is inserted into the device and the fill ports are sealed. The device is then tested to determine whether the seal is complete and the liquid crystal material is stable.

The critical materials of any LCD, in general, are the chemical nature of the liquid crystal material itself, the composition of the alignment layers 22 and 24 and the sealant composition utilized to form the fill port seal 30. Each of these materials must remain stable in the LCD and not adversely affect its performance.

The liquid crystal materials conventionally utilized in LCDs are sensitive to: extreme temperatures; certain ions which can leach out of glass substrates (sodium ions for example); and components of the fill port sealant which can be absorbed into the liquid crystal material, forming impurities. The sealant compositions of this invention are advantageous in that they have been demonstrated to be compatible with all conventional types of liquid crystal materials tested, with the exception of the phenyldioxanes. Specifically, the sealant compositions of this invention have surprisingly been found to be compatible with cyclohexane-, pyrimidine-, biphenyl- and ester-type liquid crystal materials. These types of materials and conventional mixtures thereof can be utilized in LCDs prepared in accordance with this invention.

It is conventional to form the alignment layers in an LCD of poly(vinyl alcohol) (PVA), a polyimide resin or an organo-silane, e.g. an alkyl silane. Each of these materials has advantages and disadvantages. PVA, although an excellent alignment material, has the disadvantage of being stable only up to about 85° to 95° C. Therefore, any sealant composition which must be cured above these temperatures cannot be used with PVA. PVA also possesses only adequate capacity to act as a barrier against the passage of moisture and ions, particularly sodium ions, from glass substrates into the liquid crystal material.

Organosilanes are also excellent alignment materials. Their temperature tolerance is better than PVA as they can tolerate temperatures up to about 200° to 250° C. The organosilanes, however, have essentially no blocking capacity against the passage of moisture and ions.

In contrast, alignment layers formed of polyimides are stable up to about 300° C. and are excellent barriers against the passage of moisture and ions. Polyimides, however, are disadvantageous in that they are electrically insulating. It is difficult to make electrical contact through a layer of polyimide resin without removing a portion thereof, which may be troublesome once it is cured. Also, some epoxy resins, which otherwise might be candidates for sealant compositions, do not adhere well to polyimide resins.

The sealing compositions of this invention are advantageous in that they are compatible with all of the above classes of materials. The subject sealant compositions thus provide those skilled in the art with an exceptionally wide selection of materials and processing latitudes with which to manufacture LCDs. The subject sealant compositions are further advantageous in that they may be used to form the seal of most of the periphery of the LCD substrates as well as the fill port.

The sealant compositions of this invention are comprised of a diglycidylether bisphenol A resin component and a particular amine catalyst. The resin has the following structure

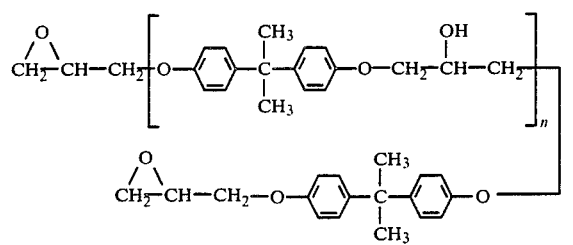

wherein n is 0-2. The resin component is suitably a mixture of compounds of the above formula wherein from about 82 to 86 percent by weight n=0, in from about 5 to 9 percent by weight of n=1 and in from about 7 to 11 percent by weight n=2. A preferred resin component is a mixture of the above compounds in the weight ratio of about 84 percent n=0, about 7 percent of n=1 and about 9 percent of n=2. Combining the above resins in these proportions will yield a resin component having a molecular weight between about 360 and 730, compared to a polystyrene standard. It is important for the molecular weight of the resin component to be within the specified range to prevent dissolution into the liquid crystal material.

The resin component of the subject sealant compositions optionally contains a minor amount, i.e. from 0 to about 10, preferably from about 7 to 8, percent by weight, based on the weight of the resin component of a conventional thixotropic agent such as, example, finely divided silica. A suitable filled resin composition is available from Castall, Inc. under the tradename CX-5532.

The amine curing agent, also available from Castall, Inc. under the tradename RT1-AX, is triethylenetetramine represented by the formula $$NH_2-(CH_2-CH_2-NH)_2-CH_2-CH_2-NH_2$$

The resin component and the curing agent are mixed in the proportion of from about 13 to 16, preferably 14 to 14.5, parts by weight of the curing agent for each 100 parts by weight of the resin component. It is necessary that the amounts of curing agent and resin be in a stoichiometric ratio and that the molecular weight of the resin component be as stated above in order to achieve the correct amount of cross-linking and avoid an excess of either component which may be dissolved by the liquid crystal material. This can lead to degradation of the liquid crystal material and consequent loss of the performance of the LCD.

The curing agent and the resin component of the sealant composition are combined and allowed to partially cure at room temperature for from about 5 to 40, preferably about 30 minutes. Alternatively, the sealant composition may be partially cured by combining the components at about 50° C. in a heated dispensing means. The partially cured sealant composition is then applied to the fill port of a filled LCD. The seal is completely cured by standing for several hours at room temperature followed by a few minutes of heating at elevated temperature. For example, the resin can be cured for about four hours at room temperature followed by 10 minutes at 90° C.; or held for 90 minutes at room temperature, 30 minutes at 60° C. and 10 minutes at 90° C., and the like. There is thus produced a stable seal of the LCD which has no adverse effect on the liquid crystal material.

The following Examples further illustrate this invention, it being understood that the invention is in no way intended to be limited to the details described therein. In the Examples, all parts and percentages are on a weight basis and all temperatures are in degrees Celsius, unless otherwise stated.

EXAMPLE 1

Glass plates 1.9 inches (4.8 cm.) x 2.3 inches (5.8 cm) and 50 mils (1.3 mm) thick, conventionally coated with indium-tin oxide conductive layers and connectors, 18 and 20 in the FIGURE, and alignment layers 22 and 24 of poly(vinyl alcohol), were separated by a number of eight micrometer thick fibers and clamped together so that the weight distribution on each was approximately equal. The alignment layers had been uniformly rubbed and the plates were clamped together so that the direction of the orientation on each was at a 45 degree angle to the other.

The subject sealant composition was prepared by mixing 14.5 parts by weight of triethylenetetramine curing agent with 100 parts by weight of CX-5532 resin, a diglycidylether of bisphenol A epoxy precursor having a molecular weight of about 550. The sealant was allowed to partially cure over a period of thirty minutes at room temperature. The sealant was applied around the periphery of the plates with the exception of about 0.5 inch (1.3 cm) to provide a fill port for the liquid crystal material. The assembly was allowed to cure for thirty minutes, heated to 60° for one hour and then allowed to return to ambient temperature.

The resultant cell was filled with ZLI 2293 liquid crystal material, available from E. Merck, Inc., and heated to the nematic/isotropic temperature of the material, i.e., about 95°. The above sealant composition, which had been mixed and allowed to partially cure for thirty minutes at room temperature, was then applied over the fill port. The device was held at the isotropic temperature of the liquid crystal material for thirty minutes, then allowed to cool to ambient temperature. The resulting LCD was completely sealed. There was no evidence of leakage or incompatibility with the liquid crystal material.

EXAMPLE 2

The following tests were utilized to determine the acceptability of the sealant composition prepared according to Example 1 as a sealant for liquid crystal displays.

BOND STRENGTH

Glass slides 1.9 inches (4.8 cm.)×2.3 inches (5.8 cm.) were coated on the periphery of their long edges with the sealant composition. Two slides were placed together offset at right angles to provide edges to be gripped in an attempt to separate them. The composition was allowed to cure as described in Example 1. A first attempt was then made to separate the slides manually to determine whether the bond was stronger than the glass.

A second set of slides was placed in boiling water for five minutes after which an attempt was made to manually separate them.

The test was repeated a third time utilizing slides coated on the surface to be adhered with a conventional polyimide, such as would be utilized as an alignment layer in LCDs, to determine the ability of the sealant to effectively bond thereto.

The test was repeated a fourth time with slides coated on one surface with a conventional silane preparation, such as would be utilized as an alignment layer in LCDs.

INITIAL LIQUID CRYSTAL ORIENTATION TEST

LCDs prepared as in Example 1 were filled with biphenyl, cyclohexyl or ester type liquid crystals available from E. Merck, Inc. as ZLI2293, ZLI2344 and ZLI1800-100. The LCDs were visually inspected immediately after sealing for alignment of the liquid crystal material with the alignment layers.

HIGH TEMPERATURE AGING TESTS AT 80°

LCDs prepared according to the process described in Example 1 were held at 80° for thirty days. The displays were visually examined for loss of liquid crystal material or air bubbles in the liquid crystal material which indicate a loss of seal integrity.

NEMATIC/ISOTROPIC TEMPERATURE

The nematic/isotropic temperature, i.e. the temperature at which the liquid crystal material becomes disordered as evidenced by it becoming transparent was determined for a given liquid crystal material. The material was then placed in contact with a sealant composition and the temperature determined again. A second sample of the sealant composition was placed in contact with the liquid crystal for a period of five days and the temperature again determined.

The sealant composition of this invention passed all tests. It was determined, however, that it was necessary to allow the subject sealant composition to partially cure over a period of about thirty minutes at room temperature before it is brought in contact with the liquid crystal material to prevent a lowering of the nematic/isotropic temperature.

CONTROL

A number of commercially available epoxy formulations were tested sequentially in the tests set forth in Example 2. When a preparation failed one of the tests, it was not tested further.

The following sealants failed one of the bond strength tests.

| MANUFACTURER | PREPARATION |
|---|---|
| E. Merck | *ZLI2458 |
| Ablestick Laboratories | *Ablefilm 539 Type 1 |
| Ablestick Laboratories | *Ablefilm 539 Type 1A |
| Transene, Inc. | Epoxy 13 |

The following sealant demonstrated incompatibility with the liquid crystal material and, therefore, failed the orientation test.

| MANUFACTURER | PREPARATION |
|---|---|
| Epoxy Technology | *Epo-Tek B 9021-1 |

The following sealants developed openings in the seal upon aging.

| MANUFACTURER | PREPARATION |
|---|---|
| Hardman, Inc. | Extrafastsetting-Red Label |
| Hardman, Inc. | Extrafastsetting Green Label |
| Acme, Inc. | Maraset 532C |
| TraCon, Inc. | BA 2116 |
| 3M Company | Scotch-Weld 2216 |
|  | Scotch-Weld 3501 |

The following sealants would not properly cure with the liquid crystal materials utilized and were not further tested.

| MANUFACTURER | PREPARATION |
|---|---|
| Ablestick | *Ablebond 681-14 |
| Epoxy Technology | *Epo-Tek H77 |
| Epoxy Technology | *Epo-Tek H 77 S |
| Epoxy Technology | *Epo-Tek B 9076-1 |
| Transene, Inc. | 50-30-2 |

The sealants marked with an asterisk are specifically recommended by the manufacturer for use in sealing LCDs.

Ablebond 681-14, Hardman Green Label and Transene Epoxy 13 all contain as the resin component a diglycidyl ether of bisphenol A.

We claim:

1. In a liquid crystal display comprising two spaced apart substrates sealed at the periphery with the exception of one or more fill ports, liquid crystal material disposed between the substrates and a sealant for the fill ports, the improvement wherein the sealant comprises a cured epoxy resin of a diglycidylether of bisphenol A precursor represented by the formula

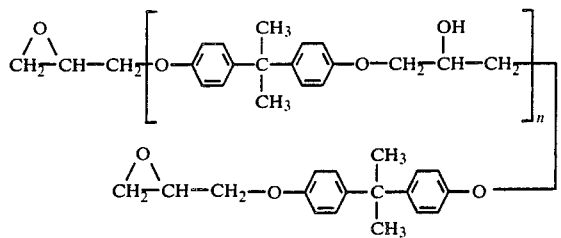

wherein n is 0–2, a curing agent hardener therefor comprising triethylenetetramine and, optionally, a minor amount of a suitable thixotropic agent.

2. A liquid crystal display in accordance with claim 1, wherein the precursor is a mixture of from about 82 to about 86 percent by weight of a compound represented by the formula wherein n is zero, from about 5 to about 9 percent by weight of a compound represented by the formula wherein n is 1 and from about 7 to about 11 percent of a compound represented by the formula wherein n is 2.

3. A liquid crystal display in accordance with claim 1, wherein the periphery of the substrates exclusive of the fill ports is sealed with said sealant composition.

4. A liquid crystal display in accordance with claim 1, wherein the sealant composition contains from about 13 to about 16 parts by weight of the curing agent for each 100 parts by weight of the precursor.

5. A liquid crystal display in accordance with claim 1, wherein the liquid crystal material is a twisted nematic liquid crystal.

6. A liquid crystal display in accordance with claim 1, wherein the thixotropic agent is finely divided silica.

* * * * *